3,369,838
SAFETY VISOR ASSEMBLY
Karl M. Nelson, 7834 SW. Capitol Hwy.,
Portland, Oreg. 97219
Filed Aug. 15, 1966, Ser. No. 572,514
7 Claims. (Cl. 296—97)

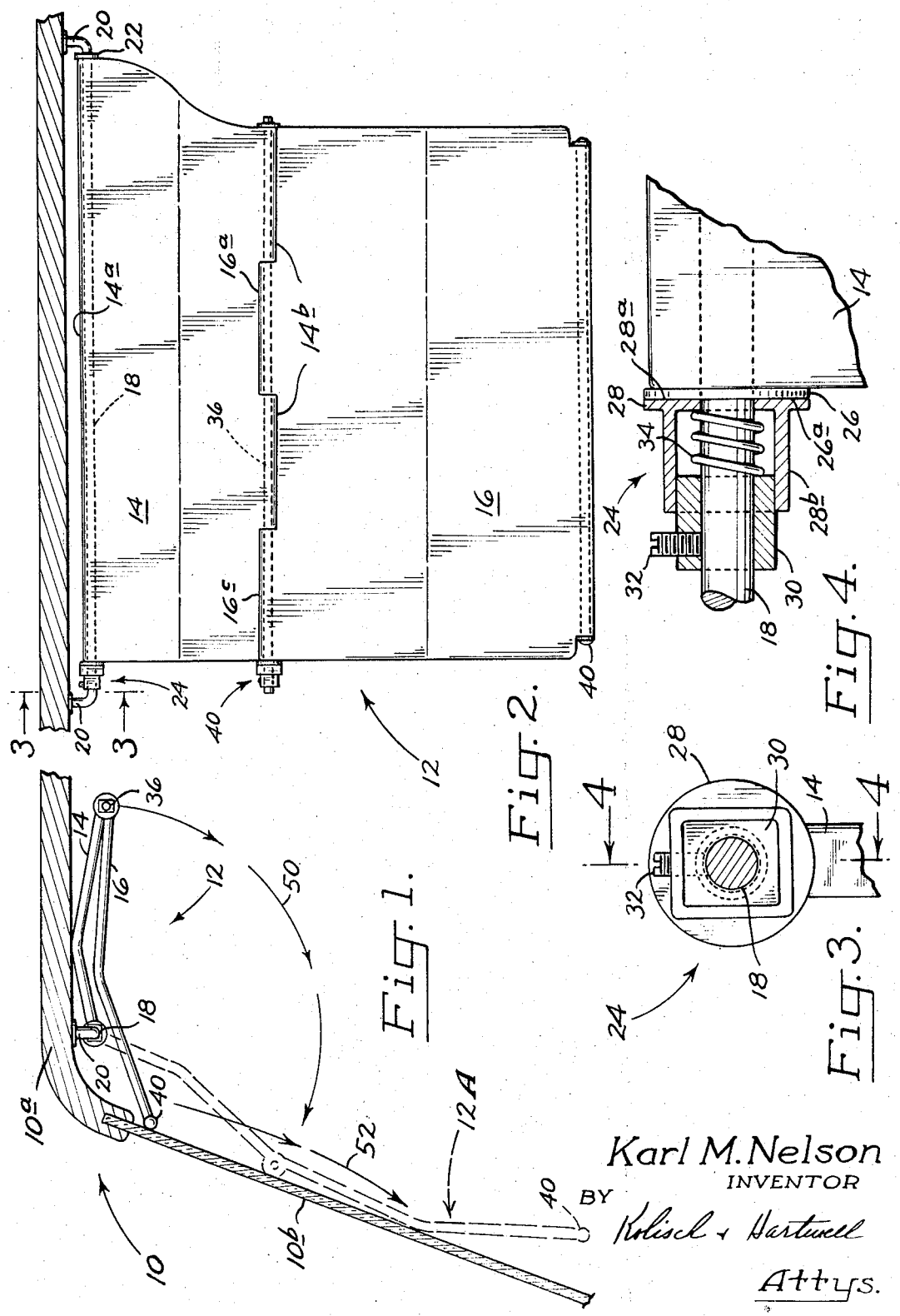

This invention relates to a novel visor assembly, such as may be incorporated in a vehicle to protect its occupants from injuries caused by the windshield on sudden vehicle deceleration.

A general object of the invention is to provide a novel visor assembly operable automatically to position itself as a shield between a vehicle occupant and windshield, on sudden vehicle deceleration.

A more specific object is to provide such a visor assembly including a visor section which may also be used to shield the eyes of an occupant from sun, headlights, etc.

The visor assembly of the invention features a pair of visor sections hinged together, one of which is hinged to the roof of vehicle cab, so organized that on sudden deceleration of the vehicle momentum in the visor sections causes them to unfold from a folded up state substantially flush with the roof of the vehicle cab (where the visor sections normally are stored), to an unfolded position extending downwardly behind the windshield on the inside of the vehicle cab. With the visor assembly in this latter position, and should a person's head be thrown forwardly on deceleration of the vehicle, the various visor sections contact the head rather than the windshield. It is contemplated that the visor sections be made of a material which will not shatter and break. Thus, the occupant's head is prevented from striking the windshield proper, with shattering and breaking of the glass and the possibility of severe lacerations resulting.

The visor assembly contemplated may have a relatively simple construction, may be produced at low cost, and is easily maintained in operating condition. As a consequence, the assembly constitutes a practical answer to correcting a hazardous condition which confronts occupants of the standard automobile.

These and other objects and advantages are attained by the invention, and the same is described in conjunction with the accompanying drawings, wherein:

FIG. 1 is a cross-sectional view of portions of a cab in an automobile, showing a visor assembly as contemplated according to one embodiment of the invention;

FIG. 2 shows the visor assembly in an unfolded condition;

FIG. 3 is an enlarged cross-sectional view, along the line 3—3 in FIG. 2; and

FIG. 4 is a cross-sectional view, along the line 4—4 in FIG. 3.

Referring now to the drawings, shown generally at 10 are portions of the body of a vehicle (the cab) which define the driver and passenger compartment in the vehicle. The vehicle body includes a roof 10a and extending downwardly from this roof, in front of where the vehicle occupants sit, a windshield 10b. Although not shown in the drawings, it should be understood that the vehicle further includes the usual seat positioning an occupant with his head to the rear of windshield 10b, which is to the right of the windshield as illustrated in FIG. 1.

The visor assembly as contemplated by a particular embodiment of this invention is indicated generally at 12. As shown in solid outline in FIG. 1, the assembly has a folded up position or state, which the assembly occupies when not in use or stored. The dashed outline designated at 12A in FIG. 1 illustrates the visor assembly in an unfolded state, which the assembly assumes automatically on rapid deceleration of the vehicle. In this unfolded position, the assembly provides a protective barrier extending downwardly adjacent the windshield, serving to shield an occupant's head should the same be thrown forwardly by vehicle deceleration.

Considering now in more detail construction particulars of assembly 12, the visor assembly includes a pair of visor sections, namely an upper visor section 14 and a lower visor section 16. As shown, each visor section is positioned with its longitudinal axis extending generally in a horizontal direction transversely of the vehicle.

Upper visor section 14 is provided along the forward edge thereof with an elongated sleeve portion 14a. Extending through this sleeve portion is an elongated rod 18. In this way the rod and sleeve portion function as a pivot means at the forward edge of the visor section mounting the section for pivotal movement about a substantially horizontal axis extending transversely of the vehicle.

Opposite ends of rod 18 may be mounted in a fixed position adjacent the roof of the vehicle through bracket mountings 20. In the particular embodiment illustrated, these extend downwardly somewhat from the roof of the vehicle to provide suitable clearance for rod 18 and the visor section and related structure which is supported on the rod.

A flange 22 joined to rod 18 limits movement of visor section 14 along the axis of rod 18 to the right in FIG. 2. Limiting movement of the visor section in the opposite direction is a spring-powered mechanism identified at 24, which also functions to restrict the freedom of pivotal movement permitted the visor section about rod 18.

Mechanism 24 is adjustable so that the amount of restriction it offers to pivotal movement may be changed. In a given installation, the mechanism is adjusted so that under normal driving conditions the visor section remains raised, or substantially in the position indicated in FIG. 1. However, and as will be more fully brought out below, on sudden deceleration, forces result urging pivotal movement in the visor section, and the mechanism in its adjusted position permits such pivotal movement to take place.

Referring more particularly to FIGS. 3 and 4, where mechanism 24 is illustrated in greater detail, fastened to the end of the visor section is an annular disc 26 having a clamping face 26a projecting away from the visor section. Abutted against this clamping face is the clamping face 28a of another annular disc 28. Disc 28 is supported on a sleeve 28b which is axially movable along rod 18. A plug 30 of rectangular cross section is clamped to rod 18 by a screw 32. This plug fits within the interior of sleeve 28b, and since the interior of sleeve 28b has a cross section corresponding to the cross section of plug 30, the sleeve is prevented from rotating relative to rod 18. Interposed between disc 28a and plug 30 is a coiled coil compression spring 34.

From this description it should be obvious that the spring exerts a bias on disc 28 forcing the disc against disc 26 which is an integral part of the upper visor section. The friction generated between the clamping faces of the discs is effective to restrict free pivotal movement of the upper visor section on rod 18. By changing of the position of plug 30 on rod 18 (through loosening and tightening of screw 32) the amount of restriction offered by the spring-powered mechanism may be adjusted.

Lower visor section 16 is mounted on upper visor section 14 by pivotally interconnecting the rear edge of the lower visor section with the adjacent rear edge of the upper visor section. Thus, shown at 14b are sleeve portions in the upper visor section which have a rod 36 extending therethrough. Rod 36, in this instance, may be nonrotatably received in sleeve portions 14b. Lower visor section 16 includes a pair of sleeve portions 16a which are aligned with sleeve portions 14b of the upper visor section. Rod 36 also extends through the sleeve portions of the lower visor section, while being relatively rotatable within these sleeve portions. The rod and the various sleeve portions together, therefore, constitute hinge or pivot means interconnecting the adjacent rear edges of the two visor sections.

Shown generally at 40 is a spring-powered mechanism which may be similar to spring-powered mechanism 24 already described. Mechanism 40 is provided to inhibit free pivotal movement of the two visor sections relative to each other, about the pivot axis provided by rod 36 and associated structure.

Referring now again to FIG. 1, which figure illustrates end elevations of the visor sections, the two visor sections are nonplaner. More specifically, upper visor section 14 has a rear margin which inclines downwardly from the front margin of the visor section. Similarly, the lower visor section includes a front margin which inclines downwardly from the rear margin of the visor section. Because of this inclination, rod 36 (which provides the pivot axis about which the two visor sections are relatively pivotable) is held at a somewhat lower elevation than rod 18 (which provides the axis about which the upper visor section pivots relative to the body of the vehicle). Further, the forward edge of the lower visor section is somewhat lower than rod 36 and the pivot axis which this rod provides between the two visor sections.

It will further be noted that in the particular embodiment of the invention illustrated, the forward edge of the lower visor section is disposed somewhat forwardly of the forward edge of the upper visor section. This places the forward edge of the lower visor section more closely adjacent the back face of the windshield in the vehicle.

A rod is shown at 40 extending through the forward edge of the lower visor section. This rod contributes weight in this region, facilitating unfolding of the assembly on sudden deceleraton, as will be described.

Describing now how the visor assembly may be utilized, as already indicated, with the assembly not in use the assembly is placed in its folded up state, with the two visor sections side by side, as shown by the solid outline for the sections in FIG. 1. The various spring-powered mechanisms which inhibit pivotal movement are adjusted to produce enough friction to hold the visor sections in this folded up state during normal driving conditions. With the visor sections thus positioned the windshield is unobscured, allowing full visibility to any occupant behind the assembly.

Should the vehicle be suddenly decelerated, because of the location of the various pivot means, and because of the mass distribution of the visor sections with relation to these pivot means, momentum in the parts functions to produce an unfolding of the assembly, whereby the same automatically shifts to the unfolded state shown by outline 12A in FIG. 1. Further explaining, most of the mass of the upper and lower visor sections is below rod 18, which provides the pivot axis between the upper visor section and the vehicle body. This results in the visor sections moving forwardly and downwardly, as indicated by the arrow 50, on vehicle deceleration. With the forward edge of the lower visor section below rod 36 and the pivot axis it provides, on rod 36 tending to be moved forwardly, the forward edge of the lower visor section is forced downwardly, as shown by the arrow 52. Further, with forward movement of the forward edge of the lower visor section, the edge may come into contact with the windshield of the vehicle, which causes the same to slide downwardly along the windshield as deceleration produces an unfolding of the parts.

The spring-powered mechanisms described are adjusted to permit the pivotal movement desired under such deceleration conditions as deemed to be best protective of the particular vehicle occupant.

In this connection, the visor assembly, when such is provided for the passenger beside the driver, might well be constructed to unfold to produce a protective shield under deceleration conditions which are not as extreme as the conditions which produce unfolding of the assembly for the driver. A vehicle driver should have visibility under most all circumstances, and his visor assembly, in most instances, would be adjusted to unfold only upon the occurrence of an abrupt deceleration such as produced by physical impact between his vehicle and an outside obstruction.

It should be pointed out that while various specific shapes have been described for the visor sections, other shapes than those specifically shown are possible. For instance, instead of being sharply bent they may have smoothly curving profiles.

Various materials may be employed in the construction of the visor sections. Fiberglass and certain plastic materials would be suitable, for instance, in providing the protective characteristics desired. Ordinarily, the visor sections need not be transparent or translucent, however, if such is desired a clear or tinted plastic material might be employed for the lower of the visor sections.

The visor assembly may be employed to give protection against light glare, such as caused by sunlight or oncoming traffic, through the expedient of lowering lower visor section with the upper visor section remaining in place. It will be noted that when such an adjustment is made, an occupant has close control over the amount of shading produced by the assembly, since the movable edge of the lower visor section is closely adjacent the windshield and not directly adjacent his eyes, and may undergo considerable movement without abruptly changing the amount of light which strikes his eyes.

While a particular embodiment of the invention has been described, it is appreciated that changes and variations are possible without departing from the invention. It is desired to cover all such modifications and variations as would be apparent to one skilled in the art, and that come within the scope of the appended claims.

It is claimed and desired to secure by Letters Patent:

1. A safety visor assembly in combination with a vehicle including a vehicle body and windshield, which assembly has a folded up state when stored and an unfolded state where the assembly provides a protective shield behind the windshield of the vehicle on sudden deceleration of the vehicle, said safety visor assembly comprising, with the visor assembly in its folded up state; an upper visor section, and first pivot means mounted adjacent a forward edge thereof mounting the upper visor section on the vehicle body adjacent the top of the windshield accommodating pivotal movement of the section about a substantially horizontal axis extending transversely of the vehicle; a lower visor section, and second pivot means pivotally interconnecting the lower visor section and upper visor section; said lower visor section having a forward edge free to swing on relative movement between the sections; said second pivot means interconnecting the visor sections being below said first pivot means and said visor sections having masses distributed with relation to the first and second pivot means so as to cause unfolding and dropping of the visor section on vehicle deceleration.

2. The safety visor assembly of claim 1, wherein said upper and lower visor sections have rear edges opposite their said forward edges which are adjacent, and said second pivot means interconnects said rear edges of said visor sections at a point located below said first pivot means.

3. The safety visor assembly of claim 2, wherein said upper visor section is nonplanar and includes a rearward margin inclining downwardly to place said rear edge at an elevation below said first pivot means.

4. The safety visor assembly of claim 3, wherein said lower visor section is nonplanar and has a forward margin inclining downwardly to place the forward edge of the section at an elevation below said second pivot means.

5. The safety visor assembly of claim 4, wherein said forward margin of said lower visor section extends forwardly of said first pivot means connecting the upper visor section to said vehicle body.

6. The safety visor assembly of claim 1, which further includes spring-powered biasing means interposed between said upper visor section and vehicle body inhibiting free pivotal movement of the upper visor section.

7. The safety visor assembly of claim 5, which further includes a first spring-powered biasing means interposed between said upper visor section and vehicle body and a second spring-powered biasing means interposed between said lower and upper visor sections, the first of said biasing means inhibiting free pivotal movement of the first visor section relative to the vehicle body about said first pivot means, and the second of said biasing means inhibiting free pivotal movement of the lower visor section relative to the upper visor section about said second pivot means.

References Cited

UNITED STATES PATENTS

| 2,254,647 | 9/1941 | Gallagher. | |
|---|---|---|---|
| 3,118,700 | 1/1964 | Von Wimmersperg | 296—84 |
| 3,188,112 | 6/1965 | Oelkrug | 280—150 |

BENJAMIN HERSH, *Primary Examiner.*

L. D. MORRIS, *Assistant Examiner.*